United States Patent
Matsui (10) Patent No.: US 6,675,184 B1
(45) Date of Patent: Jan. 6, 2004

(54) ADAPTIVE TYPE SIGNAL ESTIMATOR

(75) Inventor: Hitoshi Matsui, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/559,217

(22) Filed: Apr. 26, 2000

(30) Foreign Application Priority Data

Apr. 30, 1999 (JP) ............................................ 11-125149

(51) Int. Cl.[7] ............................................ G06F 17/10
(52) U.S. Cl. .................................................. 708/322
(58) Field of Search ................................ 708/323, 322, 708/300, 422, 425; 375/225, 341, 340, 262, 324

(56) References Cited

U.S. PATENT DOCUMENTS

| | | | |
|---|---|---|---|
| 5,029,186 A | * 7/1991 | Maseng et al. | 375/341 |
| 5,272,726 A | * 12/1993 | Furuya et al. | 375/341 |
| 5,432,821 A | * 7/1995 | Polydoros et al. | 375/340 |
| 5,436,928 A | * 7/1995 | Fukuawa et al. | 708/323 |
| 5,450,445 A | * 9/1995 | Ushirokawa | 375/324 |
| 5,537,443 A | * 7/1996 | Yoshino et al. | 708/323 |
| 5,581,577 A | * 12/1996 | Abe | 375/225 |
| 5,867,531 A | * 2/1999 | Shiino et al. | 375/262 |
| 6,473,470 B1 | * 10/2002 | Matui | 375/340 |

FOREIGN PATENT DOCUMENTS

| | | |
|---|---|---|
| JP | 58-148533 | 9/1983 |
| JP | 5-14126 | 1/1993 |
| JP | 05-014125 | 1/1993 |
| JP | 06-020208 | 1/1994 |
| JP | 06-110617 | 4/1994 |
| JP | 06-334692 | 12/1994 |
| JP | 10-13317 | 1/1998 |
| JP | 10-271051 | 10/1998 |

* cited by examiner

Primary Examiner—Chuong Dinh Ngo
Assistant Examiner—Chat C. Do
(74) Attorney, Agent, or Firm—Dickstein, Shapiro, Morin & Oshinsky, LLP.

(57) ABSTRACT

In an adaptive type signal estimator, an estimation signal storage unit outputs the first sample signal to which nonlinear distortion is added. A convolution arithmetic unit adds linear distortion to the first sample signal and outputs the second sample signal. A coefficient corrector receives the first sample signal, reception signal, and the determination signal, and corrects the second sample signal. The coefficient corrector obtains a difference signal based on a replica generated from the reception signal and first sample signal and a delayed reception signal obtained by delaying the reception signal by a predetermined period of time, obtains a product signal by multiplying the difference signal by a convergence factor, updates an impulse response value by using the product signal, and outputs the updated impulse response value to the convolution arithmetic unit.

6 Claims, 6 Drawing Sheets

ADAPTIVE TYPE SIGNAL ESTIMATOR

BACKGROUND OF THE INVENTION

1. Field of the Invention:

The present invention relates to an adaptive type signal estimator and, more particularly, to a signal estimator for reducing estimation errors in estimating a transmission signal sequence from a reception signal influenced by noise, fading that changes over time, and the like in an environment in which multipath distortion exists as in mobile communication. A reception signal to be processed is, for example, a signal accompanied by nonlinear distortion such as in narrow-band GMSK (Gaussian filtered Minimum Shift Keying).

2. Description of the Prior Art:

As a conventional device for estimating a transmission signal sequence from a nonlinearly distorted reception signal, an automatic equalizer using a RAM (Random Access Memory) is available.

Figure 1:
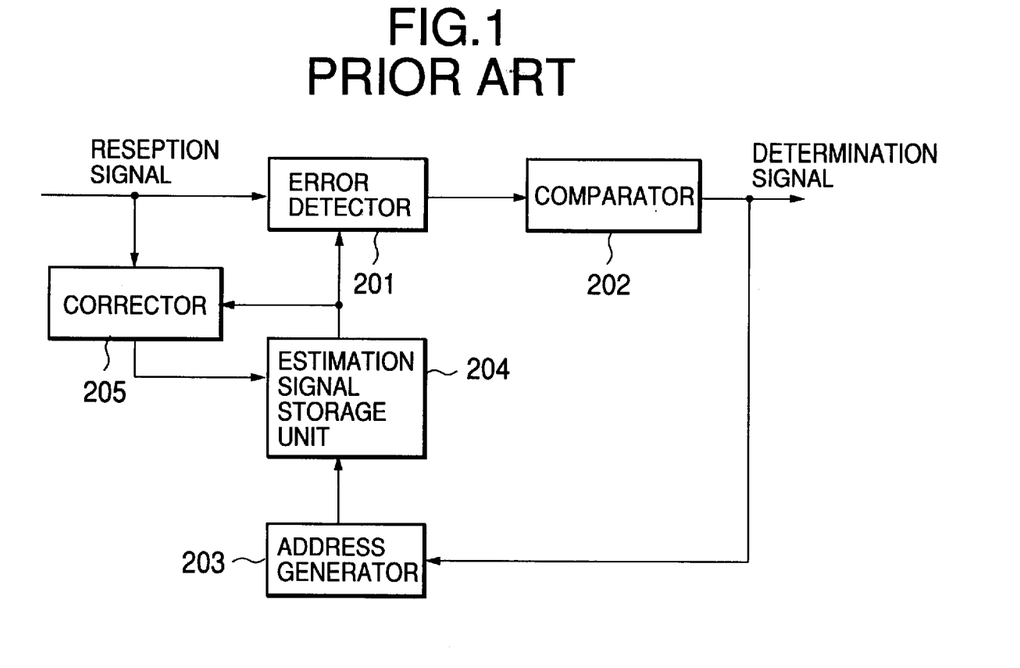
FIG. 1 is a block diagram showing the schematic arrangement of a conventional automatic equalizer.

FIG. 1 is a block diagram showing such an automatic equalizer, which is disclosed in Japanese Unexamined Patent Publication No. 5-14126 ("automatic equalizer"). Binary data of (+1, −1) is transmitted from the transmitting side upon GMSK modulation, and the signal influenced by multipath distortion in a transmission path is received on the receiving side. In general, GMSK modulation is a nonlinear modulation scheme which limits the signal band through a Gaussian filter. For this reason, this scheme produces intersymbol interference containing nonlinear distortion in a modulated signal. As the frequency band of a modulated signal is narrowed, in particular, nonlinear distortion increases. In mobile communication, a signal is influenced by multipath distortion in a transmission path. This multipath distortion leads to intersymbol interference due to linear distortion. On the receiving side, therefore, a signal containing both linear distortion and nonlinear distortion is received. In this case, as a distortion model, intersymbol interference spread across five symbol intervals is used. That is, a reception signal $x_n$ is influenced by five transmission data sequences $(u_{n+2}, u_{n+1}, u_n, u_{n-1}, u_{n-2})$. This phenomenon can be mathematically expressed as $x_n=f[u_{n+2}, u_{n+1}, u_n, u_{-1}, u_{n-2}]$. A function f is a function containing both linear distortion and nonlinear distortion.

Referring to FIG. 1, an estimation signal storage unit 204 generates all signals that can be received in a noiseless condition as sample signals. That is, 32 types of sample signals represented by $y_{31}=g[+1, +1, +1, +1, +1]$ are generated from $y_0=g[-1, -1, -1, -1, -1]$. These signals are stored in a programmable memory typified by a RAM. The function g is a function that is obtained by estimating the function f on the receiving side.

An error detector 201 obtains 32 types of branch metrics required for arithmetic operation based on a Viterbi algorithm from the 32 types of sample signals ($y_0$ to $y_{31}$) and the reception signal ($x_n$).

A comparator 202 determines a signal by performing arithmetic operation based on the Viterbi algorithm using the 32 types of branch metrics output from the error detector 201.

In general mobile communication, since users communicate with each other on move, multipath distortion also changes over time. That is, the function f changes with time. Therefore, the sample signals stored in the estimation signal storage unit 204 must be changed in accordance with changes in multipath distortion over time. The sample signals are corrected as follows.

To correct the sample signals stored in the estimation signal storage unit 204, a corrector 205 and address generator 203 are required. The address generator 203 sequentially stores the data determined by the comparator 202, and generates an estimated value $(w_{n+2}, w_{n+1}, w_n, w_{n-1}, w_{n-2})$ of transmission data $u_n$. In accordance with the output from the address generator 203, the estimation signal storage unit 204 outputs $y_n=g[w_{n+2}, w_{n+1}, w_n, w_{n-1}, w_{n-2}]$ as a sample signal. The corrector 205 then corrects the sample signal $y_n$ so it approaches the reception signal $x_n$. By performing this operation sequentially, the 32 types of sample signals stored in the estimation signal storage unit 204 gradually change. This reduces to the function g always tracking changes in the function f.

As described above, since the distortion contained in a reception signal changes with time, sample signals must always be corrected in accordance with the changes in distortion. As a method for this correction, a method of correcting a sample signal by comparing the sample signal obtained from a determination signal with a reception signal is available. In this method, since only one sample signal can be corrected by using one reception signal, an average of 32 reception signals must be input to correct all the 32 types of sample signals.

A scheme that cannot cope with nonlinear distortion, e.g., a scheme using a transversal equalizer, can correct all sample signals by using one reception signal, and hence can track changes in distortion over time no matter how the changes increase. In this scheme, however, since the tracking speed decreases to 1/32, the tracking performance greatly deteriorates.

In addition, as intersymbol interference is prolonged, the number of sample signals exponentially increases. For this reason, the hardware size increases, and the tracking speed decreases exponentially as well.

SUMMARY OF THE INVENTION

The present invention has been made in consideration of the above situation in the prior art, and has as its object to provide an adaptive type signal estimator which receives a signal accompanied by nonlinear distortion, and can quickly estimate a transmission signal sequence even if the reception signal is influenced by noise, fading that changes over time, and the like.

In order to achieve the above object, according to the main aspect of the present invention, there is provided an adaptive type signal estimator comprising an estimation signal storage unit for outputting a first sample signal to which nonlinear distortion is added, a convolution arithmetic unit for adding linear distortion to the first sample signal and outputting the signal as a second sample signal, a branch metric arithmetic unit for generating a branch metric used for Viterbi algorithm operation from a reception signal and the second sample signal, and outputting the branch metric, a signal determination unit for outputting a determination signal by performing maximum-likelihood sequence estimation using an output from the branch metric arithmetic unit on the basis of a Viterbi algorithm, and a coefficient corrector for receiving the first sample signal, the reception signal, and the determination signal, and correcting the second sample signal output from the convolution arithmetic unit, wherein the coefficient corrector obtains a difference signal on the basis of a replica generated from the reception signal and the first sample signal and a delayed reception signal obtained by delaying the reception signal by a predetermined period of time, obtains a product signal by multiplying the difference signal by a convergence factor, updates an impulse response value by using the product signal, and outputs the updated impulse response value to the convolution arithmetic unit.

According to the present invention, in obtaining sample signals used to generate branch metrics in a Viterbi algorithm, nonlinear distortion caused in a modulator on the transmitting side and linear distortion caused by a multipath effect in a transmission path are taken into consideration separately to perform adaptive control on only linear distortion that changes over time so as to track only changes in linear distortion over time, but no adaptive control is performed on nonlinear distortion that does not change over time.

To obtain a sample signal, a signal that does not change over time is generated by using a memory table in consideration of nonlinear distortion, and linear distortion is added to the signal. Sample signals can be made to always track changes in linear distortion over time by always correcting linear distortion components used in convolutional operation on the basis of a reception signal and a determination result about the reception signal.

According to the present invention described above, a reception signal can be estimated in an environment including both nonlinear distortion typified by distortion in nonlinear modulation and linear distortion typified by multipath distortion that changes over time. In the prior art, in particular, the response speed of adaptive control to track changes in multipath distortion over time is low, and a large memory capacity is required. In contrast to this, according to the present invention, these problems can be solved by performing estimation processing separately for nonlinear distortion and linear distortion. In mobile communication using narrow-band GMSK, which is a modulation scheme effectively using a frequency band and attaining high power efficiency in transmitters, an improvement in performance and a reduction in apparatus size can be achieved by the present invention in communication using a transmission path in which multipath distortion changes over time. The effect of the present invention is great especially in a field in which the size of a device such as a portable terminal and power consumption are important factors.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

A preferred embodiment of the present invention will be described below with reference to the accompanying drawings.

Figure 2:
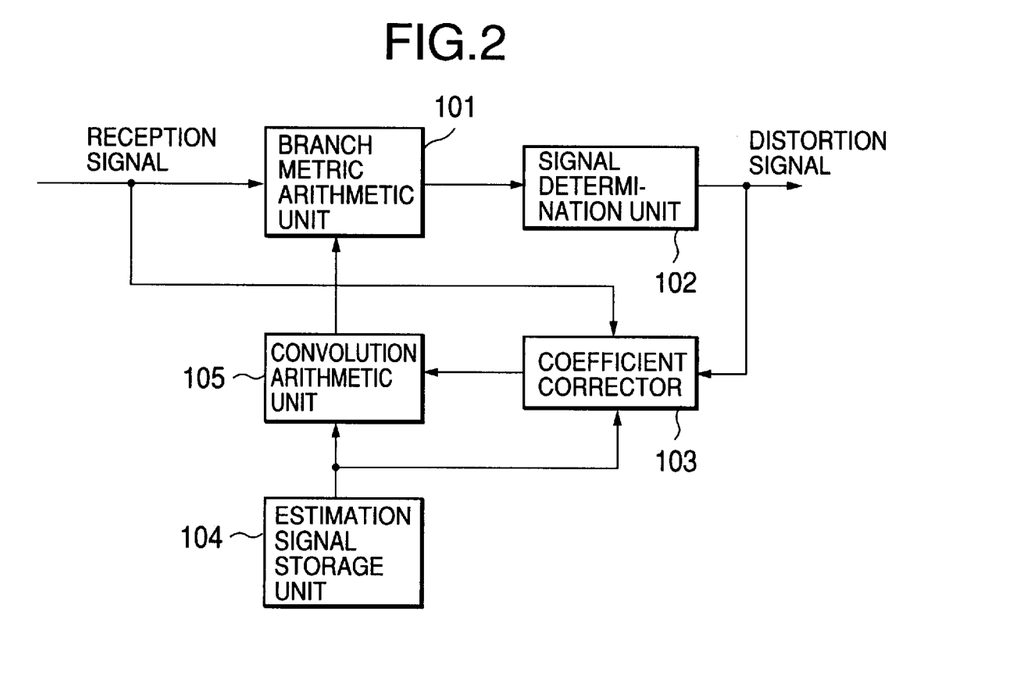
FIG. 2 is a block diagram showing the schematic arrangement of an adaptive type signal estimator according to an embodiment of the present invention.

FIG. 2 is a block diagram of an adaptive type signal estimator of the present invention. An estimation signal storage unit 104 outputs a plurality of signals containing nonlinear distortion. A convolution arithmetic unit 105 performs convolutional operation between an output signal from the estimation signal storage unit 104 and an output signal from a coefficient corrector 103. A branch metric arithmetic unit 101 obtains a branch metric based on a Viterbi algorithm from a reception signal and the output signal from the convolution arithmetic unit 105. A signal determination unit 102 performs signal estimation based on the Viterbi algorithm by using the output signal from the branch metric arithmetic unit 101, and outputs the estimation result as a determination signal. The coefficient corrector 103 corrects a linear distortion coefficient to match it with the linear distortion contained in the reception signal by using the reception signal and the determination signal, and outputs the corrected linear distortion coefficient to the convolution arithmetic unit 105.

A signal transmission model to which the adaptive type signal estimator of the present invention can be applied will be described below. For the sake of simplicity, a binary sequence consisting of 0s and 1s is used as a transmission signal sequence. The following description, however, applies to an M-sequence. In addition, modulation is performed by GMSK. In GMSK modulation, as the signal band is limited by using a Gaussian filter, intersymbol interference occurs. Furthermore, since GMSK modulation is a frequency modulation scheme which is nonlinear modulation, nonlinear distortion is added to the intersymbol interference. In this case, for the sake of simple explanation, a model is used, in which intersymbol interference containing nonlinear distortion spreads across two symbol intervals, including its own symbols. Intersymbol interference is also caused by multipath distortion in a transmission path. This distortion is linear distortion. In this case, a model is used, in which intersymbol interference due to multipath distortion spreads across two symbol intervals, including its own symbols.

In mobile communication, since multipath distortion changes over time, a signal estimation method that tracks changes in multipath distortion over time must be used to perform accurate signal estimation on the receiving side. On the other hand, nonlinear distortion caused in GMSK modulation is unique to a modulation circuit and does not change over time, and hence can be known in advance on the receiving side. According to the present invention, therefore, linear distortion components that change over time and nonlinear distortion components that do not change over time are processed separately.

Figure 3:
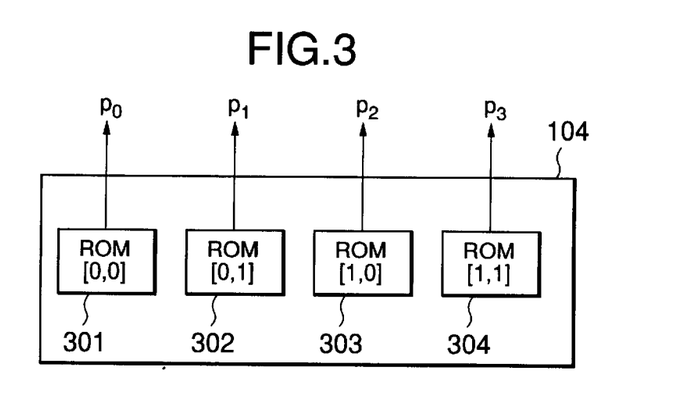
FIG. 3 is a block diagram showing the schematic arrangement of an estimation signal storage unit.

FIG. 3 is a block diagram of the estimation signal storage unit 104 for outputting nonlinear distortion signals spreading across two symbol intervals as nonlinear distortion. There are four combinations of two symbols, i.e., [0, 0], [0, 1], [1, 0], and [1, 1]. With the respective combinations, nonlinear distortion signals are expressed as $p_0=f[0, 0]$, $p_1=f[0, 1]$, $p_2=f[1, 0]$, and $p_3=f[1, 1]$. The function f is a nonlinear distortion function and determined by parameters in a modulation scheme, and hence [$p_0$, $p_1$, $p_2$, $p_3$] cab be written in a ROM (Read Only Memory) in advance. As shown in FIG. 3, by preparing four types of ROMs 301, 302, 303, and 304, nonlinear distortion signals [$p_0$, $p_1$, $p_2$, $p_3$] can be output from these ROMs. Note that when the intersymbol interference of an M-value code containing nonlinear distortion spreads across n symbol intervals, the estimation signal storage unit 104 includes $M^n$ ROMs.

Figure 4:
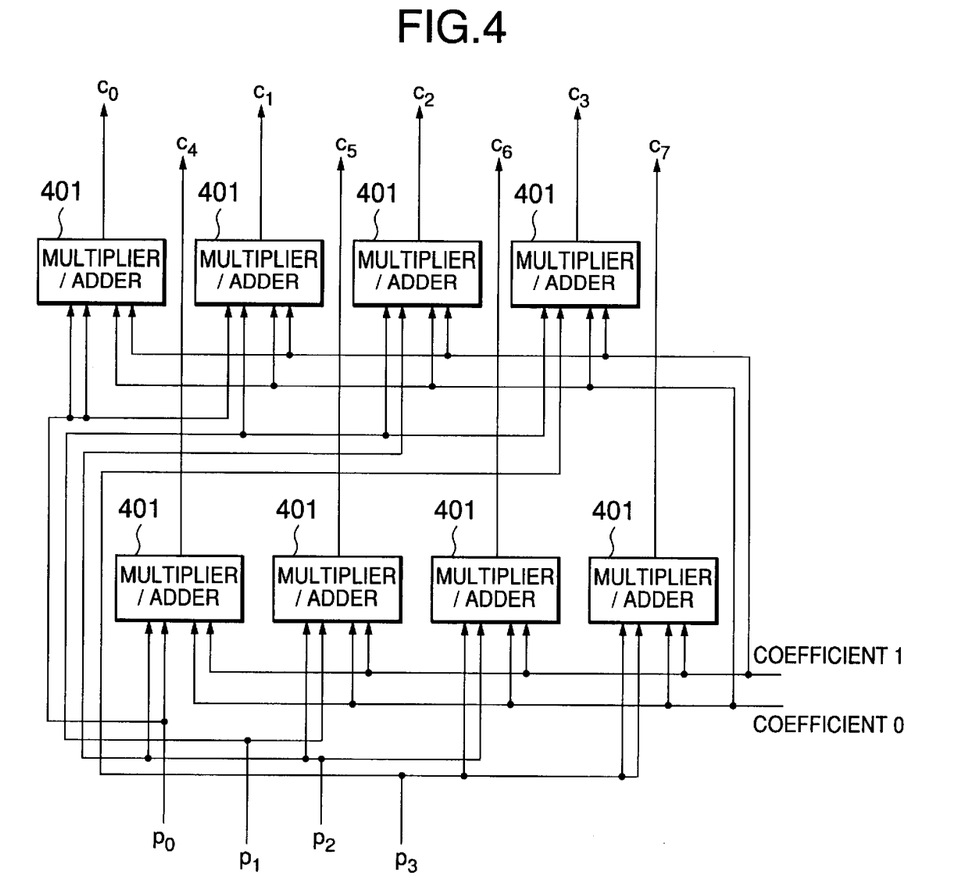
FIG. 4 is a block diagram showing the schematic arrangement of a convolution arithmetic unit.

FIG. 4 is a block diagram of the convolution arithmetic unit 105. The four nonlinear distortion signals [$p_0$, $p_1$, $p_2$, $p_3$] input from the estimation signal storage unit 104 are subjected to convolutional operation in eight multiplier/adders 401. As a consequence, eight sample signals [$c_0$, $c_1$, $c_2$, $c_3$, $c_4$, $c_5$, $c_6$, $c_7$] are output.

Figure 5:
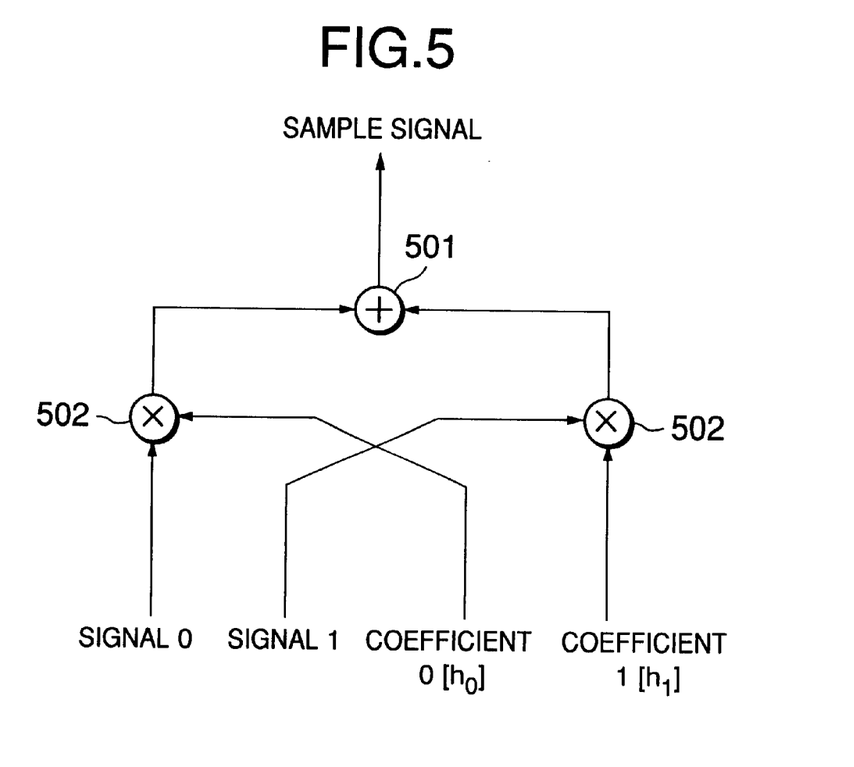
FIG. 5 is a block diagram showing the schematic arrangement of a multiplier/adder.

FIG. 5 is a block diagram of each multiplier/adder 401. As shown in FIG. 5, each multiplier/adder 401 can be made up of a multiplier 502 and adder 501.

Equations below represent the sample signals. Letting [$h_0$, $h_1$] be coefficients 0 and 1 which are the impulse response values of intersymbol interference, the respective sample values are respectively expressed by:

$$c_0 = h_1 p_0 + h_0 p_0 = h_1 f[0,0] + h_0 f[0,0] \quad \ldots (1)$$

$$c_1 = h_1 p_0 + h_0 p_1 = h_1 f[0,0] + h_0 f[0,1] \quad \ldots (2)$$

$$c_2 = h_1 p_1 + h_0 p_2 = h_1 f[0,1] + h_0 f[1,0] \quad \ldots (3)$$

$$c_3 = h_1 p_1 + h_0 p_3 = h_1 f[0,1] + h_0 f[1,1] \quad \ldots (4)$$

$$c_4 = h_1 p_2 + h_0 p_0 = h_1 f[1,0] + h_0 f[0,0] \quad \ldots (5)$$

$$c_5 = h_1 p_2 + h_0 p_1 = h_1 f[1,0] + h_0 f[0,1] \quad \ldots (6)$$

$$c_6 = h_1 p_3 + h_0 p_2 = h_1 f[1,1] + h_0 f[1,0] \quad \ldots (7)$$

$$c_7 = h_1 p_3 + h_0 p_3 = h_1 f[1,1] + h_0 f[1,1] \quad \ldots (8)$$

Figure 6:
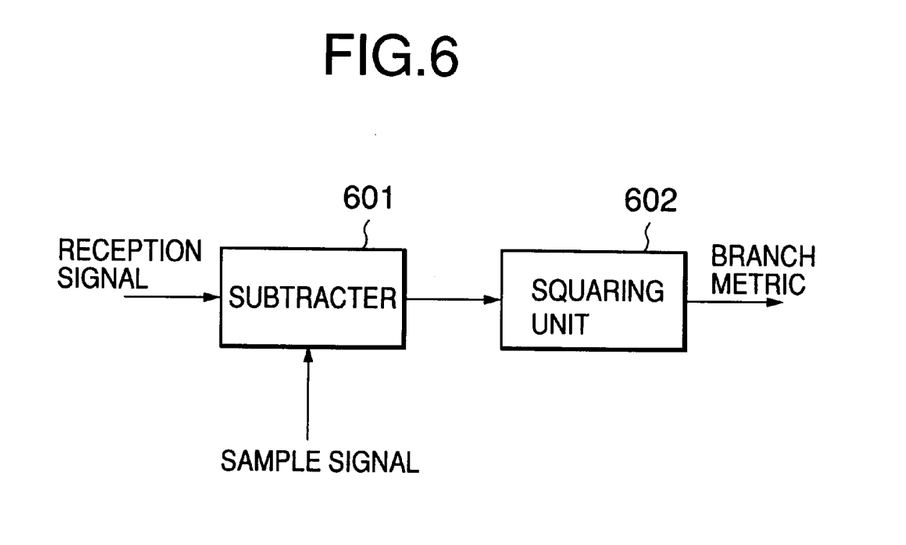
FIG. 6 is a block diagram showing the schematic arrangement of a branch metric arithmetic unit.

FIG. 6 is a block diagram of the branch metric arithmetic unit 101. A branch metric can be defined as the Euclidean distance between a reception signal and a sample signal, and hence is computed in the following sequence. A subtracter 601 obtains the difference between a reception signal and a sample signal. A squaring unit 602 then squares the difference and outputs the resultant data as a branch metric.

Letting $r_n$ be a reception signal at time n, eight branch metrics $b_{n,k}$ (k=0, 1, 2, ..., 7) can be expressed by:

$$b_{n,k} = (r_n - c_k)^2 \quad \ldots (9)$$

The signal determination unit 102 determines a reception signal sequence by using the eight branch metrics. As a signal sequence determination method, a maximum-likelihood estimation method using the Viterbi algorithm is used.

Figure 7:
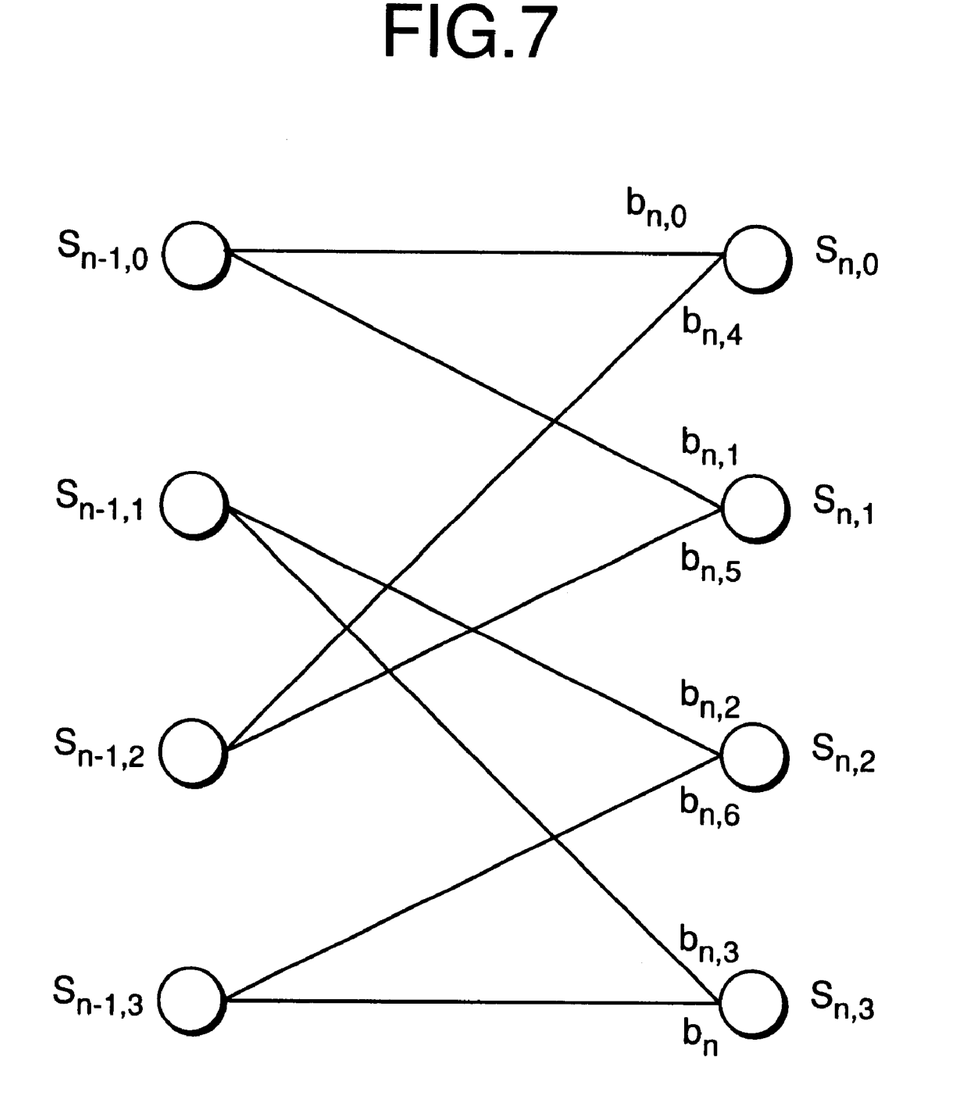
FIG. 7 is a state transition diagram in a Viterbi algorithm.

FIG. 7 is a state transition diagram for explaining arithmetic operation based on the Viterbi algorithm. Path metric values $s_{n,k}$ (k=0, 1, 2, 3) at time n can be obtained from path metric values $s_{n-1,k}$ (k=0, 1, 2, 3) and branch metrics $b_{n,k}$ (k=0, 1, 2, ..., 7).

The path metric values $s_{n,k}$ (k=0, 1, 2, 3) at time n are given by equations (10) to (13) below. In each equation, min[a, b] represents arithmetic operation of comparing a with b and extracting a smaller one. A determination value can be obtained by repeating this arithmetic operation and tracing back several surviving sequences.

$$s_{n,0} = \min[s_{n-1,0} + b_{n,0}, s_{n-1,2} + b_{n,4}] \quad \ldots (10)$$

$$s_{n,1} = \min[s_{n-1,0} + b_{n,1}, s_{n-1,2} + b_{n,5}] \quad \ldots (11)$$

$$s_{n,2} = \min[s_{n-1,1} + b_{n,2}, s_{n-1,3} + b_{n,6}] \quad \ldots (12)$$

$$s_{n,3} = \min[s_{n-1,1} + b_{n,3}, s_{n-1,3} + b_{n,7}] \quad \ldots (13)$$

The obtained determination value is output as a determination signal to an external unit, and is also output, to the coefficient corrector 103, as a signal for making the coefficients [$h_0$, $h_1$] track changes in linear distortion over time.

Figure 8:
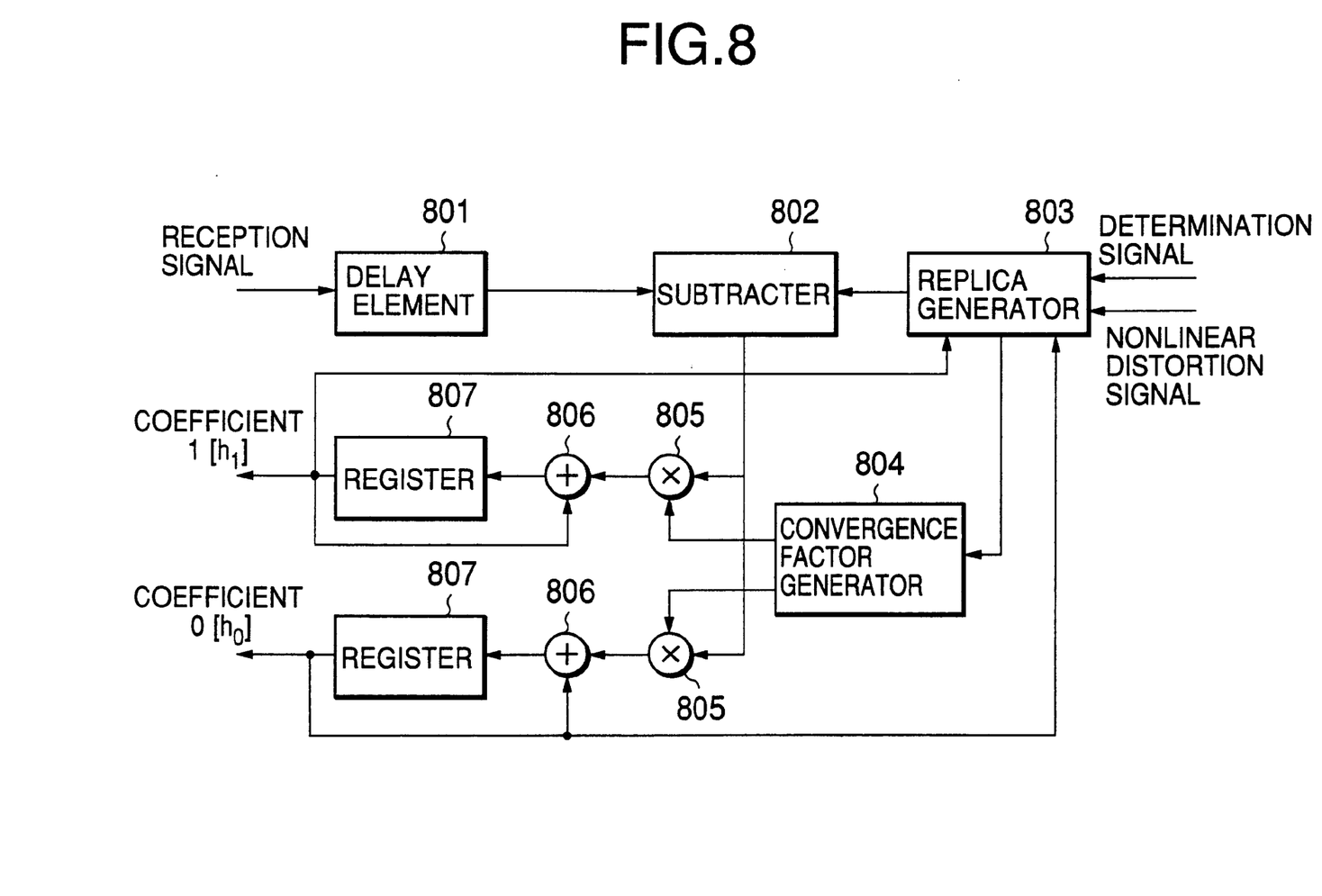
FIG. 8 is a block diagram showing the arrangement of a coefficient corrector.

FIG. 8 is a block diagram of the coefficient corrector 103. A delay element 801 delays a reception signal. Upon reception of a reception signal, the signal determination unit 102 outputs a determination signal with a delay. For this reason, the delay element 801 must delay the reception signal to match the reception signal with the determination signal in timing.

In an algorithm for correcting coefficients, a replica of the reception signal is generated first, and the coefficients are then corrected by using the replica. Let $r_n$ be a reception signal at time n, and $d_n$ be a determination signal for the reception signal. First of all, a replica generator 803 generates a replica $s_n$ of the reception signal from determination signals [$d_n$, $d_{n-1}$, $d_{n-2}$] at times n, n–1, and n–2 and coefficients [$h_0$, $h_1$] which are coefficients 0 and 1.

The replica $s_n$ is given by:

$$s_n = h_0 f[d_n, d_{n-1}] + h_1 f[d_{n-1}, d_{n-2}] \quad \ldots (14)$$

Figure 9:
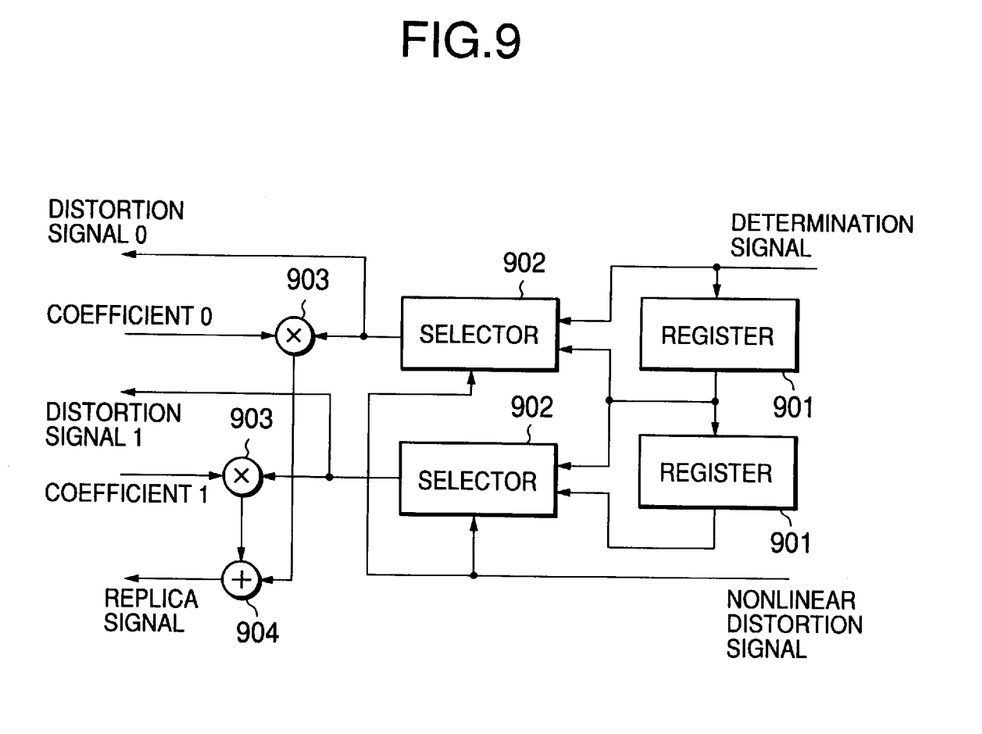
FIG. 9 is a block diagram showing the arrangement of a replica generator.

FIG. 9 is a block diagram of the replica generator 803. The replica signal $s_n$ and $f[d_n, d_{n-1}]$ and $f[d_{n-1}, d_{n-2}]$ which are distortion signals 0 and 1 are obtained and output on the basis of a determination signal, an output signal from the estimation signal storage unit 104, and [$h_0$, $h_1$] which are coefficients 0 and 1.

The coefficients [$h_0$, $h_1$] are corrected by:

$$h_0 \leftarrow h_0 + \mu f[d_n, d_{n-1}](r_n - s_n) \quad \ldots (15)$$

$$h_1 \leftarrow h_1 + \mu f[d_{n-1}, d_{n-1}](r_n - s_n) \quad \ldots (16)$$

The meanings of the above two mathematical expressions will be described with reference to FIG. 8. A subtracter 802 obtains ($r_n - s_n$) from a reception signal output from the delay element 801 and a replica signal output from the replica generator 803. A convergence factor generator 804 outputs the results obtained by multiplying $f[d_n, d_{n-1}]$ and $f[d_{n-1}, d_{n-2}]$ by a coefficient $\mu$ (constant) for determining the response speed of adaptive control. A multiplier 805 obtains a product signal by multiplying the difference signal from the subtracter 802 by the output signal from the convergence factor generator 804. The coefficients [$h_0$, $h_1$] are stored in a register 807 in advance. An adder 806 adds the product signal output from the multiplier 805 to the output from the register 807 to update the coefficients [$h_0$, $h_1$] stored in the register 807.

In this manner, linear distortion components that change over time can be processed.

What is claimed is:

1. An adaptive type signal estimator comprising:

an estimation signal storage unit for outputting a first sample signal to which nonlinear distortion is added;

a convolution arithmetic unit for adding linear distortion to the first sample signal and outputting a signal as a second sample signal;

a branch metric arithmetic unit for generating a branch metric used for Viterbi algorithm operation from a reception signal and the second sample signal, and outputting the branch metric;

a signal determination unit for outputting a determination signal by performing maximum-likelihood sequence estimation using an output from said branch metric arithmetic unit on the basis of a Viterbi algorithm; and a coefficient corrector for receiving the first sample signal, the reception signal, and the determination signal, and outputting data correcting the second sample signal output from said convolution arithmetic unit, wherein said coefficient corrector obtains a difference signal on the basis of a replica generated from the determination signal and the first sample signal and a delayed reception signal obtained by delaying the reception signal by a predetermined period of time, obtains a product signal by multiplying the difference signal by a convergence factor, updates an impulse response value by using the product signal, and outputs the updated impulse response value to said convolution arithmetic unit.

2. An estimator according to claim 1, wherein said coefficient corrector comprises a delay element for delaying the reception signal by a period of time between the instant at which the reception signal is input and the instant at which the determination signal is output.

3. An estimator according to claim 1, wherein the convergence factor is a constant.

4. An estimator according to claim 1, wherein said estimation signal storage unit comprises $M^n$ read only memories (ROMs) when intersymbol interference of an M code containing the nonlinear distortion is in a symbol state in which the intersymbol interference spreads across n symbol intervals, the respective ROMs storing nonlinear distortion components in number determined by the symbol state, and the nonlinear distortion components being output to said convolution arithmetic unit.

5. An estimator according to claim 4, wherein said convolution arithmetic unit performs convolutional operation for the $M^n$ nonlinear distortion components, and outputs the operation result as a sample signal.

6. An estimator according to claim 1, wherein said convolution arithmetic unit performs convolutional operation for the $M^n$ nonlinear distortion components, and outputs the operation result as the second sample signal to said branch metric arithmetic unit.

* * * * *